S. P. NOE.

AUTOMATIC RELIEF VALVE FOR PNEUMATIC TIRES.

APPLICATION FILED MAR. 6, 1912.

1,064,526. Patented June 10, 1913.

WITNESSES

C. M. Walker.

G. F. Baker.

INVENTOR

Seaman P. Noe

By [signature] Attorney

UNITED STATES PATENT OFFICE.

SEAMAN P. NOE, OF OCEAN GROVE, NEW JERSEY.

AUTOMATIC RELIEF-VALVE FOR PNEUMATIC TIRES.

1,064,526. Specification of Letters Patent. Patented June 10, 1913.

Application filed March 6, 1912. Serial No. 681,999.

*To all whom it may concern:*

Be it known that I, SEAMAN P. NOE, a citizen of the United States, residing at Ocean Grove, in the county of Monmouth and State of New Jersey, have invented certain new and useful Improvements in Automatic Relief-Valves for Pneumatic Tires, of which the following is a specification.

This invention relates to safety valves for pneumatic tires.

If a pneumatic tire be inflated beyond its full capacity it is subjected to more or less interior strain and these interior strains due to the tire being inflated to more than its full capacity or to the expansion of the air incident to heat, frequently causes what is known as a "blow out", sometimes rendering the tire absolutely useless or requiring considerable expense to repair the same.

One of the objects of the present invention is to provide a safety valve for the inflation of pneumatic tires embodying among other characteristics means whereby in the event of excessive pressure within the tire incident to an over quantity of fluid or by virtue of expansion of heated gases therein, the excessive pressure in the tire will be relieved automatically to avoid or prevent blow outs frequently happening to inflated tires.

With the above and other objects in view the present invention consists in the combination and arrangement of parts hereinafter more fully described, illustrated in the accompanying drawings and particularly pointed out in the appended claim, it being understood that changes may be made in the form, proportion, size and minor details without departing from the spirit or sacrificing any of the advantages of the invention.

Figure 1:
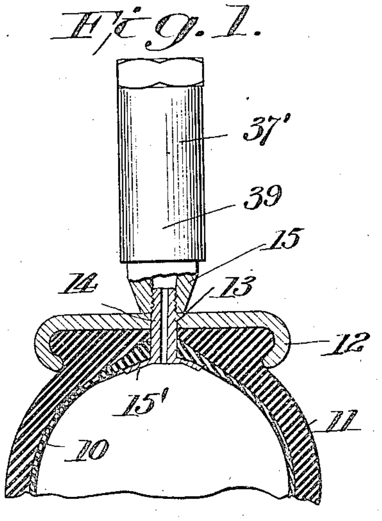
Figure 2:
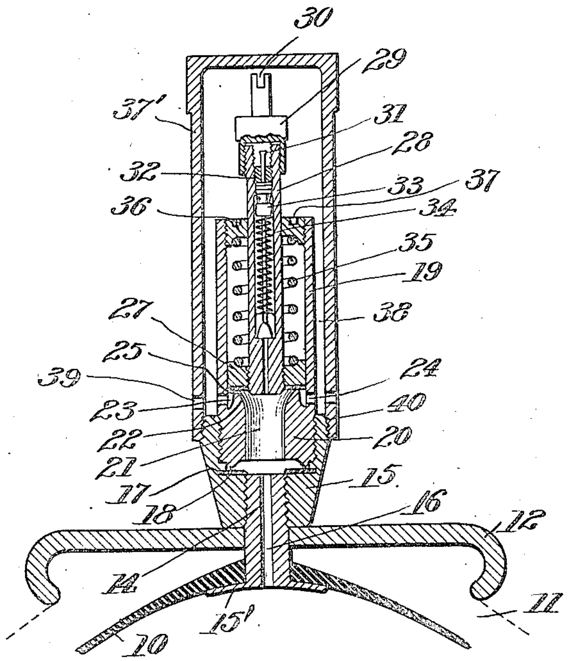

In the drawings:—Figure 1 is a sectional view through a portion of a pneumatic tire illustrating my invention in elevation, the connections with the tire being shown in section. Fig. 2 is an enlarged detail sectional view of my improved automatic valve.

Referring now more particularly to the accompanying drawings, the reference character 10 indicates an inner tube of any ordinary type for pneumatic tires which is inclosed in a casing 11 of any suitable type and which is held in operative condition by means of a clencher or other suitable rim 12 provided with an opening 13 through which and also through the inner side of the casing 11 extends a nipple 14 which is secured in any suitable manner, as for instance, by a head 15′ to the inner tube 10, the outer end of the nipple 14 being screw threaded as shown. Secured to the screw threaded outer end of the nipple 14 is another nipple 15, preferably, although not necessarily tapered exteriorly as shown, and at its inner side provided with a screw threaded socket which has communication with the bore 16 of the aforesaid nipple 14 and in the bottom of which socket there is preferably disposed packing material 17 on which rests the reduced annular edge 18 of the outer end of a valve casing whose outer end is screw threaded into the screw threaded socket of the nipple 15, as shown.

Formed with or secured in the outer end of the casing 19 is a valve seat 20 provided with a bore 21 which alines with the aforesaid bore 16 of the nipple 14. The bore 21 of the valve seat 20 is preferably slightly tapered interiorly as indicated at 22 and has the exterior of its inner end preferably cut away to provide an annular space 23. Formed in the side walls of the aforesaid valve casing 19 are oppositely disposed perforations 24. By virtue of the cut away portion of the valve seat and the tapered interior thereof the valve seat is provided with a reduced annular edge 25 upon which latter rests suitable packing material carried on the outer face of the valve 27 and which effects a normal non-leaking joint connection between the valve 27 and the reduced annular edge 25 of the valve seat. The valve 27 is provided with a hollow stem 28 having at its outer end a removable cap 29 which latter is provided with a socket end 30 adapted to provide a wrenching means for engagement with the stem 31 of the adjusting nut 32 which is mounted in the outer end of the hollow stem 28 to adjust the check valve 33 against the action of the helical or other spring 34 designed to maintain the check valve 33 normally closed and yet have such tension as to permit the ingress of air from the pump or other suitable source (not shown), through the stem, the first-named valve and the nipples 15 and 16 into the inner tube. This check valve mechanism may be of any ordinary type, and, as usual, in addition to permitting the ready flow of air into the inner tube prevents the escape of air from the inner tube.

The inner side of the valve 27 is preferably concave to receive one end of the helical of other spring 35 whose opposite end is fitted preferably in a concaved face of an adjusting nut 36 having screw threaded engagement in the outer end of the casing 19 and which nut 19 may be manipulated to adjust the tension of the spring 35 in any suitable manner. The adjusting nut 36 is preferably provided with sockets 37 to receive any suitable wrench to facilitate screwing and unscrewing of the same.

There may be two or more apertures 24 in the side walls of the casing 19, and for that matter, a single perforation may be employed to perform the function of a plurality of apertures. In any event, the apertures 24 are preferably disposed toward the outer end of the casing 19 slightly beyond the inner edge of the valve seat 20 so that if any dust or dirt should find its way through the apertures it would lodge in the space 23 between the valve seat 20 and the casing 19 and thereby be prevented from entering the tire. Another reason for having the apertures 24 disposed as explained with relation to the valve seat is to have the valve 27 always in a position inwardly toward the inner end of the casing 19 beyond the apertures 24 so that upon the slightest movement of the valve 27 from its valve seat 20 the excessive air would immediately leave the casing 19. The excessive air is not permitted to go to the inner end of the casing 19 on the inner side of the valve 27 and thereby possibly cause an equalized or back pressure. The excessive air is preferably confined, while in the casing 19, between the outer end of the casing and the outer side of the valve 27 with the latter always disposed slightly inwardly beyond the apertures 24. The result is that in the event of excessive pressure which cannot find its way out through the hollow valve stem 28, because of the check valve 33, the valve 27 will be lifted from its seat against the tension of the spring 35 and the excessive air is forced by the outer face of the valve 27 down into the interspace 23 between the casing 19 and the valve seat 20 and thence laterally outward through the apertures 24 in the casing 19 to the atmosphere. Thus the excessive air has very little space to occupy in the casing 19 because the slightest movement of the valve 27 from its seat effects an immediate discharge of the excessive air.

It is common in inflation of pneumatic tubes to use a testing device at certain periods of the inflation in order to determine whether the predetermined quantity of air has been pumped into the tire. This requires unfastening the pump connection with the tire and is more or less laborious and unsatisfactory. In the use of the present valve, which may be readily secured to any pneumatic tube, the moment that the predetermined pressure in the tire has been reached there is an immediate warning caused by the noise resulting from the expelling of the excessive pressure through the apertures 24. After the tire has been blown up to its full capacity there is always danger of the air becoming heated and consequently expanding, in which event, the tire is automatically relieved of the excessive pressure.

If desired, the valve casing 19 may be provided with a dust cap 37′. This dust cap may be secured over the valve mechanism in any suitable manner, one way being to provide for a screw connection 40 with the nipple 15. It is preferable that the connection be made so as to provide an interspace 38 between the casing 19 and the cap 37′ and to provide the cap with openings 39 which are preferably arranged out of alinement with the apertures 24 in the casing 19. Obviously, the openings 39 of the cap may be disposed in alinement with the apertures 24 in the casing 19, and this arrangement is illustrated in Fig. 2 for purpose of convenience rather than to provide a separate view illustrating the apertures 39 disposed out of alinement with the apertures 24. Any dust or dirt finding its way through the apertures 39 of the cap 37′ would lodge in the interspace 38 between the casing 19 and cap 37′.

In referring in this specification to inner and outer ends of certain elements I mean by the inner end that part disposed toward the axis of the wheel on which the valve is or may be used, and by outer end I mean that end which is adjacent the rim of the wheel on which the valve is or may be used.

From the foregoing it will be seen that I provide a simple, inexpensive, durable and efficient safety valve for obviating blow outs incident to excessive pressure in pneumatic tires.

What is claimed is:—

In a valve structure of the character described, a casing provided with apertures in its side walls and having a valve seat therein, the inner end of the valve seat being spaced from the inner wall of the casing to form an annular passage adjacent said apertures, a valve provided with a hollow stem, and a check valve in the hollow stem to permit inflation of the tire through the stem, said first-mentioned valve being lifted from its valve seat under influence of excessive pressure in the tire and which excessive pressure is forced by said first-mentioned valve out of the casing through said passage and said apertures.

In testimony whereof I affix my signature in presence of two witnesses.

SEAMAN P. NOE.

Witnesses:
GEO. B. SMITH,
SAMUEL B. NOE.